Figure 1:
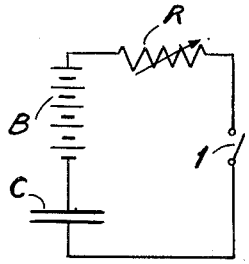

Oct. 24, 1939.   M. O. JÖRGENSEN ET AL   2,177,569
METHOD AND MEANS FOR MEASURING VOLTAGES
Filed Dec. 23, 1935   2 Sheets-Sheet 1

M. O. Jörgensen
M. P. Weibel
INVENTORS

By: Glascock Downing Seebold
Attys.

Oct. 24, 1939.   M. O. JÖRGENSEN ET AL   2,177,569
METHOD AND MEANS FOR MEASURING VOLTAGES
Filed Dec. 23, 1935   2 Sheets—Sheet 2

M. O. Jörgensen
M. P. Weibel
INVENTORS

By Glascock Downing & Seebold
Attys.

Patented Oct. 24, 1939

2,177,569

UNITED STATES PATENT OFFICE 2,177,569

METHOD AND MEANS FOR MEASURING VOLTAGES

Mathias Oluf Jörgensen and Marius Peter Weibel, Copenhagen, Denmark

Application December 23, 1935, Serial No. 55,916
In Denmark January 2, 1935

12 Claims. (Cl. 175—183)

The present invention relates to a method, apparatus, and circuit arrangments for measuring short time intervals by means of a condenser which is charged and discharged through resistances. The said apparatus especially serves the purpose of measuring the velocity of high speed bodies such as bullets.

Therefore mechanical or electrical means have been used for measuring very short time intervals, for instance when determining bullet velocities. As indicators in electrical circuit arrangements ballistic galvanometers have been needed which on account of inconsiderable damping are well adapted for the measurement of short rushes of current and in which the passed quantity of electricity is estimated from the maximum deflection of the pointer.

It has further been proposed for this object to use the so-called condenser chronographs whereby use has been made of the fact that during a measuring period a condenser of known capacity is charged or discharged through a non-inductive resistance of predetermined value. When a contact is interrupted through the intervention of a bullet the circuit will be closed so that the condenser will be charged through the resistance according to the well-known exponential function of time. If the circuit is again interrupted by the bullet at another contact point the condenser will keep the potential assumed at the expiration of the time interval to be measured. The calculation of the interval can now be made by means of well-known formulae. With these devices it was ascertained that on account of the varying resistances, the voltage and the like, the initial conditions did not remain constant so that several adjustments were necessary. It was also found that the electrostatic voltmeters used, such as mirror galvanometers, electron tube voltmeters and the like, do not permit portability of the devices. They were therefore limited to use in laboratories.

It has also been proposed to carry the rush of current over a Wheatstone bridge through two screens one of which was arranged together with an adjustable resistance in one arm of the bridge whereas the other screen was inserted together with another adjustable resistance in the external battery circuit.

It has also been recommended, for the object of closing and interrupting a condenser circuit to use only a single wire inserted as a resistance in the condenser circuit and broken by the bullet. It has also been suggested to use two condensers in order to determine the direction of motion of the body. It has finally been recommended to insert in the charging circuit a resistance by which the discharge of the condenser through the insulation resistance of the measuring device was compensated.

With all these arrangements, however, an absolute measurement of voltage was necessary so that repeated adjustments had to be made.

These inconveniences have been overcome by the present invention. The present invention relates to a method of measuring short time intervals by means of condenser chronographs, the said method being characterized in that the charge condition of the condenser is measured by means of a potentiometer.

According to a preferred form of invention the measuring voltage need not be the very potential difference of the condenser, but to increase the exactitude of measurement a relatively low measuring voltage may be chosen as compared with the potential difference of the condenser. Furthermore, the measurement of the charge condition of the condenser with relation to the voltage of the source of current may preferably be made by means of a switch. The residual charge phenomena of the measuring condenser may be compensated by means of an auxiliary condenser.

The invention further relates to a circuit arrangement for the measurement of short time intervals by means of condenser chronographs, the said circuit arrangement being distinguished by the fact that a potentiometer having a fixed contact or a sliding contact or various contacts is so connected in parallel with the source of current used for charging the condenser that the difference between the total voltage of the source of current or a fraction thereof and the potential difference of the condenser is used as a measuring voltage. The circuit arrangement according to the invention in a preferred embodiment thereof is characterized by a switch which from the measuring position may be thrown over to a position in which preferably a variable fraction of the voltage of the source of current may be compared with the measuring voltage.

According to another form of the present invention a relay is provided in the circuit arrangement which, directly upon expiration of the measuring period, will disconnect one, several, or all of the conductors connecting the circuit arrangement with the switches from which the beginning and the end of the measuring period are determined.

According to a preferred embodiment of the present invention an electron discharge tube is used as a relay governor, a relay coil being inserted in the plate circuit of the said tube while its grid and cathode are so arranged as to impart a negative voltage potential to the grid relatively to the cathode at the moment when the last operated contact is opened.

According to a further form of the invention an auxiliary condenser having about the same residual charge conditions as the measuring condenser is used along therewith, the said auxiliary condenser being previously charged to approximately the potential difference to be arrived at by the measuring condenser, and just at the moment when the sudden variation of the potential of the measuring condenser will occur the auxiliary condenser is short circuited for a short while and then connected in series with the measuring condenser so that the amount of potential difference of both condensers will be approximately constant.

The invention further relates to an apparatus for measuring short time intervals, the said apparatus being characterized by the provision of a variable resistance, a source of current, a condenser which may in some cases be a variable condenser, a potentiometer connected with a switch, a plate battery and a measuring instrument.

According to a particular embodiment of the invention an electron discharge tube having a plate, a grid and a filament is used as a relay governor.

According to a further form of the invention an auxiliary condenser that may be connected in series with the measuring condenser is provided.

Figure 2:
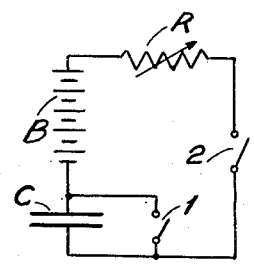
Figure 3:
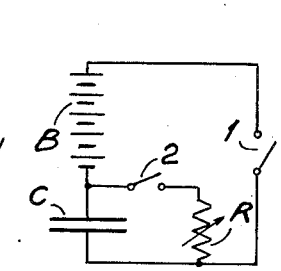
Figure 4:
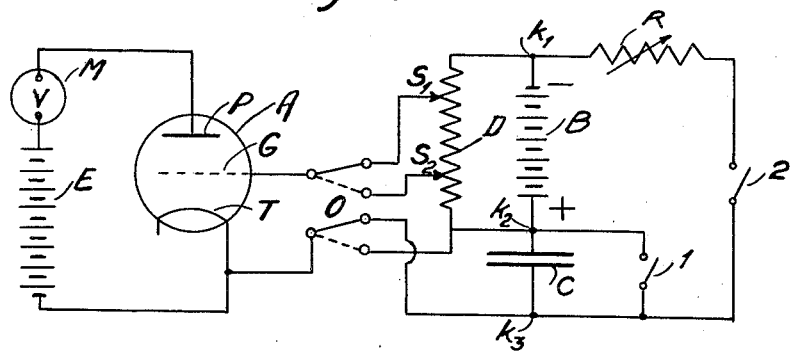
Figure 5:
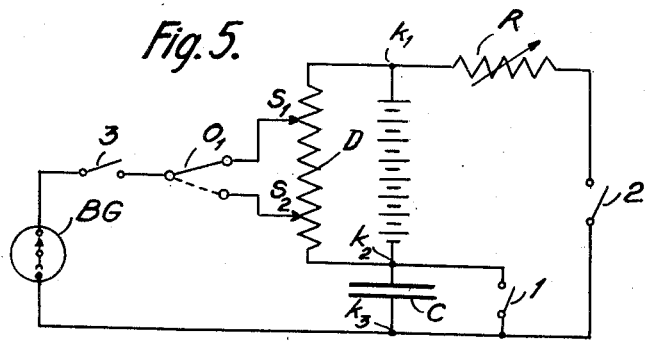
Figure 6:
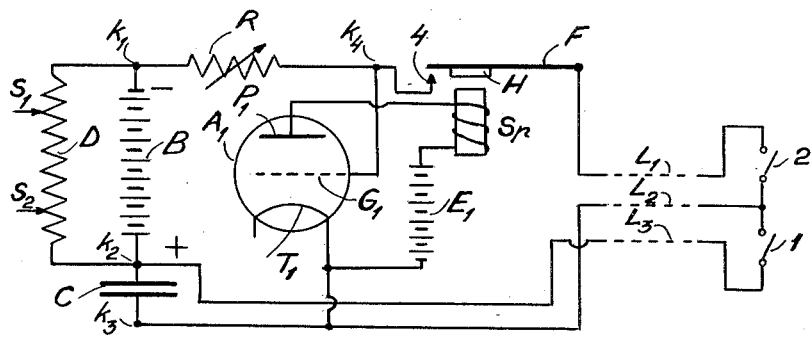
Figure 7:
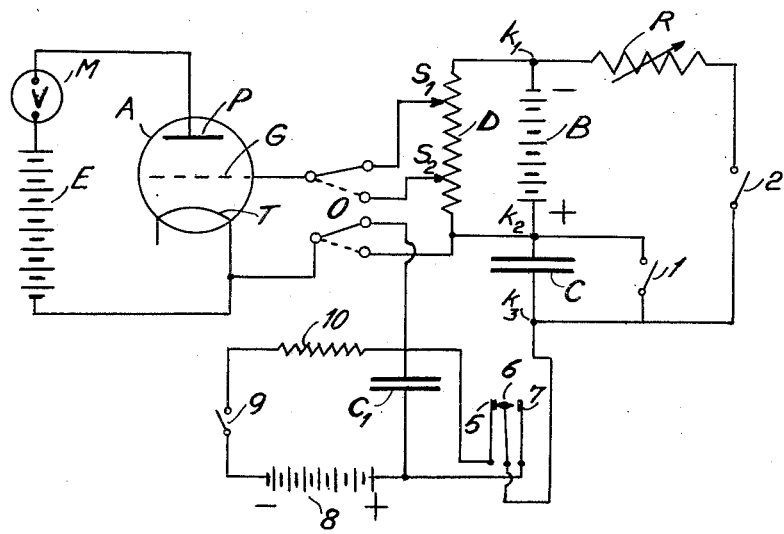

By way of example some embodiments of the invention are shown in the accompanying drawings where Fig. 1–3 diagrammatically illustrate the circuit arrangements of previously known condenser chronographs, Fig. 4 diagrammatically a particular embodiment of the present invention, Fig. 5 another circuit arrangement according to the invention, Fig. 6 a further form of the present invention, and Fig. 7 a particular embodiment of the invention provided with an auxiliary condenser.

The present invention has the object of measuring a relatively brief time interval by making use of the relationship existing between the potential difference between the terminals of a condenser and the voltage of the charging source, which enables the said measurement by making use of well known physical laws.

This may perhaps be explained most readily by referring to the series circuit diagrammatically illustrated as a part of Fig. 4. Let $E$ denote the voltage of the source of current $B$; $R$ the resistance of the circuit and $C$ the capacity of the condenser C. In the series circuit $k_2$, $k_1$, R, 2, $k_3$, $k_2$, when the switch 2 is closed the condenser C at once begins to charge, the electricity passing from the source B, through the resistance R, into the condenser C. The conventional law governing this current $i$ is $$i = \frac{E}{R} \cdot \epsilon^{-\frac{t}{RC}} \quad (1)$$

In this equation $t$ is the elapsed time since the closing of the switch and $\epsilon$ is the base of the natural system of logarithms. Let $v$ designate the voltage at the terminals of the condenser.

Then obviously, $v = E - iR$ since $iR$ is the drop of potential in the resistance R and E is the total voltage of the source.

From Equation 1, on multiplying by R, we get $$iR = E \epsilon^{-\frac{t}{RC}}$$

whence $$E - iR = E - E \epsilon^{-\frac{t}{RC}}$$

but $v = E - iR$ hence $$v = E\left(1 - \epsilon^{-\frac{t}{RC}}\right)$$

solving this for $$\epsilon^{-\frac{t}{RC}}$$

we get $$\epsilon^{-\frac{t}{RC}} = 1 - \frac{v}{E} \quad (2)$$

The first member of this equation enables the determination of $t$ when $$\frac{v}{E}$$

is known since all the other quantities involved are known constants. For instance, upon taking the logarithm of each member of (3) and solving for $t$ we get $$t = -RC \log_\epsilon \left(1 - \frac{v}{E}\right) \quad (3)$$

It will be noted that it is not necessary to know or determine the actual value of either $v$ or $E$, but merely to know their ratio. Hence the actual value of the voltage of the source of current B, within suitable limits, is of no importance whatever.

This ratio may be found as follows:

With reference to Fig. 4 it is now assumed that the contact $S_1$ divides the resistance of the voltage divider D into two portions the proportion of which is:

$$a = \frac{S_1 k_2}{k_1 k_2}$$

With the switch O in the position shown in full lines and the condenser charged to the voltage $v$ the voltage between the grid G and the filament T of the electron tube A will be determined by $$aE - v \quad (4)$$

Corresponding to this grid voltage the meter M will give some deflection or other, U.

It is further assumed that the contact $S_2$ divides the potentiometer resistance into two portions the proportion of which is $$b = \frac{S_2 k_2}{k_1 k_2}$$

If directly upon reading off the response U the switch O is thrown over to the position shown in dotted lines, and the contacts $S_2$ is set so that the meter M will again give the same response U, we must have $$aE - v = bE$$

or $$v = (a - b)E$$

hence $$\frac{v}{E} = a - b \quad (5)$$

If the voltage divider is so arranged that the proportions $a$ and $b$ can be exactly enough determined by the positions of the contacts $S_1$ and $S_2$, the proportion $$\frac{v}{E}$$

can be determined from (5) and thus the time interval $t$ from (3).

The main feature of the present invention is the use of the potentiometer resistance D and the switch O. Together these two devices make possible a relative measurement, i. e. a relative measurement of $v$ in proportion to E, the exact or absolute values of all battery voltages in the arrangement being therefore immaterial (up to certain operating limits) as well as the deflection of the meter M.

Beyond this the potentiometer resistance D enables increased exactitude of measurement, because the voltage $aE-v$ acting upon the measuring device (in Fig. 4 the electron tube A with the meter M and in Fig. 5 the ballistic galvanometer BG but otherwise any other device) is a difference between a certain part of the voltage of the source of current and the potential difference of the condenser, and this difference may be kept relatively small in proportion to the potential difference of the condenser. The percentual exactitude of measurement may thereby be considerably greater than with arrangements in which the condenser potential difference itself is used as the measuring voltage.

The figures will now be described in detail.

In Fig. 1 one pole of a source of direct current, for instance a battery B, is connected with an adjustable resistance R and thence to one terminal of a current interrupter or a switch 1, whereas the other pole is connected to a condenser C which in its turn is connected to the other terminal of the switch 1. With this known embodiment the switch 1 is closed at the beginning of the measuring period. The current from the source B then charges the condenser C. When the switch 1 is opened again at the end of the measuring period the charging of the condenser C will be interrupted.

From the potential difference of the condenser C the time can be calculated in a previously known manner.

With the known circuit arrangement of a condenser chronograph as shown in Fig. 2 the charging of the condenser C will begin when the switch 1 is opened, in a manner known per se, by means of a bullet or the like. When the switch 2 is thereupon also opened the charging of the condenser C will be interrupted.

In Fig. 3 another known arrangement is illustrated. Before the beginning of the measurement the switches 1 and 2 are closed. The condenser C has been charged with the total potential difference of the battery B, simultaneously also existing across the resistance R. At the beginning of the measuring period the switch 1 is opened, the discharge of the condenser C being thereby initiated through the resistance R. At the end of the measuring period the switch 2 will be opened and the discharge thereby interrupted.

As stated above these previously known arrangements suffer from the inconveniences that the potential difference must be measured in its total amount and that the initial conditions are not constant so that repeated adjustments are necessary. The sources of error are therefore considerable and the exactitude of measurement is correspondingly bad.

These inconveniences are overcome by the present invention. As shown for instance in Fig. 4 the source of current B, the adjustable resistance R, the switches 1 and 2 and the condenser C are arranged in a way similar to that shown in Fig. 2, but in addition thereto a voltage divider D is provided which is connected with the terminals $k_1$ and $k_2$ of the source of current B. The voltage divider D has sliding contacts $S_1$ and $S_2$ by which the resistance of the voltage divider is divided into two parts the relation of which may be read off. O is a double pole switch connected with an electron discharge tube A having three electrodes, i. e. a plate P, a grid G and a cathode or filament T. The plate P of the discharge tube A is connected through a measuring instrument M and a source of current, for instance a plate battery E, to the filament T thereby forming the plate circuit.

When the switch O takes up the position shown in full lines the grid G of the discharge tube A will be connected to the sliding contact $S_1$ of the voltage divider D, while the filament T is connected through the double pole switch O to the terminal $k_3$ of the condenser C. In this position the voltage between the grid G and the filament T is determined by the voltage between $S_1$ and $k_3$ which is the difference between a known fraction of the voltage of the source of current B and the potential difference of the condenser C. By regulating the resistance R and adjusting the sliding contact $S_1$ correspondingly to the length of the measuring period the voltage between $S_1$ and $k_3$ may be so adjusted as to impart a suitable negative potential to the grid G of the discharge tube A in relation to the filament T thereof. The value of the voltage between $S_1$ and $k_3$ can now be read off from the measuring instrument M when the dependency between the grid potential and the current of electrons in the discharge tube A is known. If the voltage of the source of current B is known the voltage of the condenser and the duration of the measuring time interval may be calculated.

It is not desirable, however, that a definite dependency between the grid voltage and the electron current of the discharge tube A should be reckoned with because an exact adjustment of filament current and plate voltage would then be necessary. According to the present invention it is possible by means of the switch O to make an adjustment of the measuring device immediately upon each measuring. The switch O is thrown over into the position shown in dotted lines, and by means of the sliding contact $S_2$ the measuring instrument M is again caused to make the same deflection as read off at the measuring just finished. The voltage between $S_1$ and $k_3$ will thereby be compared with a recordable fraction of the source of current so that it is unnecessary to read off the voltage in volts. Thus only relative values are measured, and according to the present invention the examination of the exact value of the voltage of the source of current B is therefore not necessary for the calculation. It will easily be understood without further explanation that this is of great importance for the practical use of the measuring arrangement according to the invention as the formerly necessary repeated adjustments are thereby made superfluous.

The potentiometer device D according to the present invention has a double way of operation. By means of this potentiometer it is rendered possible to measure the voltage between $S_1$ and $k_3$ serving the purpose of determining the charging conditions of the condenser, while it was previously necessary to measure the voltage of the condenser itself. It is of great advantage in the circuit arrangement according to the invention that the measuring voltage only should be low in comparison with the voltage of the condenser, and it is therefore not necessary to measure the voltage between $S_1$ and $k_3$ with a very great exactitude. Furthermore, by means of the switch O an adjustment of the arrangement is obtained directly upon each measurement so that the measuring will become independent of the voltage of all the sources of current employed in the circuit arrangement.

These two functions of the potentiometer are mutually independent and may be used separately without departing from the scope of invention. Thus the adjustment explained above may for instance be used in circuit arrangements, in which the voltage of the condenser itself is measured for the determination of the charging conditions of the condenser.

In Fig. 4 the voltage divider D has been shown quite diagrammatically. The said potentiometer is preferably so arranged that the division of it into parts may be varied and read off with sufficient exactitude. For this purpose the voltage divider may for instance be provided with a third sliding contact (not shown) which is connected to the filament T when the switch O takes up the position shown in dotted lines. No principal varieties and no deviation from the idea of invention will occur thereby.

The sliding contact $S_2$ may also be omitted, if the sliding contact $S_1$ is adjustable within a wide range of the voltage divider D. The grid G is then connected to $S_1$ without interruption, and the switch O is a single pole switch. The upper half of the switch as shown in Fig. 4 may thus be left out. However, it is preferable to maintain the sliding contact $S_2$, but then the sliding contact $S_1$ may be in fixed connection with the voltage divider.

With the circuit arrangement shown in Fig. 4 the measurement between $S_1$ and $k_3$ is made by means of a suitable measuring instrument inserted in the plate circuit of an electron discharge tube. The invention, however, is not limited to this embodiment. The measuring may also be done by means of a portable ballistic galvanometer. This has not, of course, the same high measuring exactitude as an instrument more particularly adapted for use in laboratories. But as mentioned above, according to the present invention it is not necessary to read off with the same great exactitude as when the voltage of the condenser is itself measured, because only a low voltage in comparison with the voltage of the condenser is measured according to the present invention.

A circuit arrangement with a ballistic galvanometer B G is by way of example shown in Fig. 5. This arrangement corresponds to that shown in Fig. 2 with a voltage divider according to Fig. 4, but in addition a ballistic galvanometer B G is connected at one end to the terminal $k_3$ of the condenser C and at the other end through a switch 3 to the single pole switch $O_1$. After the measuring period the switch 3 is closed thereby causing a deflection of the pointer of the galvanometer B G proportional to the voltage between $S_1$ and $k_3$. From this deflection the voltage of the condenser may be calculated when the galvanometer has been adjusted and the voltage of the source of current is taken into account. However, a calibration of the galvanometer may be made on the spot by throwing over the switch $O_1$ into the position shown in dotted lines and then closing the switch 3, the condenser C having been short circuited in advance by closing the switch 1. The deflection of the galvanometer B G will then be proportional to the voltage between $S_2$ and $k_2$ representing a known fraction of the voltage of the source of current B. With this method the examination of the actual voltage of the source of current B is again left out of consideration, this being of course a very considerable advantage of the greatest practical importance.

When the measuring instrument is a ballistic galvanometer or other measuring instrument the deflection of which is proportional to the voltage or the charge it is not necessary in itself that the sliding contact $S_2$ should be adjustable.

With the circuit arrangements shown in Figs. 4 and 5 the various parts must be very well insulated from one another and from the ground. The condenser C should be maintained at a voltage or a charge until the measuring instrument M (Fig. 4) has been read off, or till the switch 3 (Fig. 5) has been closed. The various parts of the apparatus may be very well insulated. Under certain circumstances, however, such as for instance on measuring the time of flight of bullets, the switch 1 or 2 (Fig. 4 or 5) or both switches must be mounted at a relatively great distance from the apparatus. Thereby the contacts will often be connected with the proper measuring instrument by means of relatively long conductors so that a sufficient insulating of switches and conductors will become difficult. In such cases it is recommended to insert relays connecting the measuring instruments with the switches and to arrange the circuits so that the relays will disconnect the conductors and the switches from the apparatus as soon as the switch 2 is opened. The relays may be inserted in one or more conductors according to circumstances. A single relay may also be used provided with various contacts for various conductors.

Fig. 6 illustrates an embodiment of the invention in which a relay is used. $A_1$ is an electron discharge tube the grid $G_1$ of which is connected to the terminal $k_4$ while the filament $T_1$ is connected to the terminal $k_3$. In the plate circuit is inserted a source of current $E_1$ which may for instance be the same as the source of current E according to Fig. 4 if the circuit arrangement of Fig. 4 is used. Furthermore a relay coil $S_r$ is inserted in the plate circuit for the purpose of operating an armature H. When the current flows through the coil $S_r$ the electro-magnet will be energized, the armature H attracted and the contact 4 thereby closed. When the current is interrupted the coil $S_r$ will become currentless, the armature H will be lifted by the spring F and the contact 4 will again be opened. The switches 1 and 2 are connected to the proper measuring instrument through conductors $L_1$, $L_2$ and $L_3$. The operation of the arrangement of Fig. 6 is as follows:

Before the measuring the switches 1 and 2 are closed. By closing the contact 4, for instance by hand, the grid $G_1$ in the electron discharge tube $A_1$ will be directly connected with the filament $T_1$. The tube $A_1$ has no negative grid bias, and a current sufficient for keeping the contact 4 closed will flow through the coil $S_r$. If at the end of the measuring period the switch 2 is opened the grid $G_1$ will get a negative potential with respect to the filament $T_1$. This is of importance because the condenser C with a view to securing exactitude in measuring time intervals ought not to be charged to the total voltage of the source of current B. The current flowing through the relay coil $S_r$ will thereby become so weak that the spring F opens the contact 4.

In Fig. 6 the relay is inserted in only one of the conductors $L_3$. It may, however, also be provided with more contacts so that several or all the conductors $L_1$ and $L_2$ and/or $L_3$ may be switched off.

As stated above the contact 4 may be closed by hand before the measuring, the contact having first been closed. It may, however, also be closed by short-circuiting a contact shunted to the contact 4.

The arrangement of a relay in combinaton with an electron discharge tube as shown in Fig. 6 may also be used with the arrangement of Fig. 5 for an automatic closing of the switch 3 at the end of the measuring period.

It has further been ascertained that in the known arrangements for measuring short time intervals as shown in Figs. 1–3 the inconvenience may occur that the condenser will display more or less considerable residual charge phenomenon.

If in the arrangements shown in Figs. 1 and 2 for instance the condenser is charged from 0 to a certain potential the voltage will not remain constant even if the insulation is quite reliable. On the contrary the voltage of the condenser will decrease momentarily and only in the course of some time will become practically constant. This constancy thus occurs at a voltage somewhat below the voltage prevailing immediately after the measuring. A certain instability in the measuring and reading off the measuring instruments will be caused thereby, it being, however, possible to compensate therefor by a correction of the apparatus.

However, it is also possible to completely abolish the said residual charge phenomena by inserting another condenser, a so-called auxiliary condenser $C_1$, as shown in Fig. 7. The auxiliary condenser $C_1$ should preferably be so dimensioned as to display approximately the same residual charge phenomena as the condenser C. 5, 6 and 7 are relay contact springs. The auxiliary condenser $C_1$ is connected through a switch 9 and a resistance 10 to a source of current 8 in the manner shown in Fig. 7. The relay contact springs 5, 6 and 7 are controlled by a relay coil and an armature (not shown). Before measuring, the contact spring 6 is connected with the contact spring 5, while directly after the measuring the spring 6 is connected with the contact 7 whereas the contact connection 5, 6 is interrupted. The arrangement of the contact springs 5, 6, 7 should be so chosen that the spring 6 engages the spring 7 before the contact with the spring 5 is interrupted so that by throwing over the contact spring 6 the auxiliary condenser $C_1$ will become short-circuited for a short while.

The operation of the circuit arrangement shown in Fig. 7 is as follows:

Before the measuring the contact spring 6 is connected with the contact spring 5. Otherwise the arrangement corresponds to that shown in Fig. 4. If the switch 9 is closed for a short time the auxiliary condenser $C_1$ will be charged to a certain voltage by a current flowing from the source of current 8 through the resistance 10. The source of current 8 is shown in Fig. 7 only to get a better understanding of the arrangement, but it may be omitted and the charging of the auxiliary condenser $C_1$ may take place for instance by means of the source of current B. The auxiliary condenser $C_1$ should be charged to the voltage which the condenser C will approximately have at the time of measuring. Directly at the end of the measuring period the relay will switch the contact spring 6 from the contact 5 to the contact 7, the condenser $C_1$ being short-circuited for a short time during the switching, as above stated. In the new position of the contacts the condenser $C_1$ is connected in series with the condenser C. As the voltage of the auxiliary condenser $C_1$ will increase and the voltage of the condenser C will have a tendency to decrease correspondingly the sum of the two voltages will be constant. The deflection of the pointer of the measuring instrument M will also remain practically constant when the insulation is quite reliable.

It has been found that the exactitude of measuring of the apparatus for measuring time of flight according to the present invention is exceedingly great. For instance when measuring periods of time of the order of 0.002 up to 0.200 second the result obtained may differ from the exact value by less than $\frac{2}{1000}$. Thereby the distance between the screens in which the rushes of current are set up by the bullet in a manner known per se may be considerably decreased. The apparatus according to the present invention may therefore be used for the examination of small arms, heavy machine guns and small calibre guns.

As the apparatus according to the present invention can be mounted in a compact state it may be made portable. By use of a carbon microphone in combination with the apparatus according to the present invention velocities of 800 m. per sec. may be reliably measured with a measuring distance of 8 m. It needs no further explanation to understand that this is of great practical importance, for instance by the proof firing of bigger calibres.

The invention may also advantageously be used for measuring times of flight. The apparatus will be put in working order by simply closing for instance the switches 1 and 2. Should the switches 1 and 2 fail to work reliably any irregularity will at once appear from the apparatus, measuring errors being thereby excluded. Any adjustments in advance, for instance the measuring of the battery voltage are not necessary because the absolute value of the battery voltage is unimportant.

For recording purposes a simple milliammeter may be used. An erroneous indication of the instrument is also unimportant and without influence upon the results of measuring because only relative values are read off.

The invention is also applicable to measuring the time of operation of relays, for example in telephone circuits, so as to determine the small period of time which elapses from the moment the relay is excited until its armature makes a desired contact, or the short period of time elapsing from the moment when the armature breaks one contact and closes another.

The method and apparatus according to the present invention may preferably be further used for echo measuring, for instance in case of vehicles such as watercraft, airships and the like.

While the circuits for charging and interrupting the charge of the condenser C have been described as being opened and closed by the switches 1 and 2 it is to be understood these circuits may be opened by a bullet interrupting the respective circuits.

We claim:

1. In voltage measuring apparatus for measuring the potential of a charged condenser, a charged condenser, a source of current, a potentiometer associated with said condenser and connected across said source, said potentiometer being divided into known portions of the voltage of said source, a measuring circuit, a switch for connecting said measuring circuit to one side of the condenser and to a known portion of said voltage derived from said potentiometer so that the difference between the known portion of the total voltage of the source and the potential of the condenser may be impressed across the measuring circuit, said switch being movable to another position to connect the measuring circuit across a variable portion of the source so that the variable voltage can be compared with the first measured voltage.

2. In voltage measuring apparatus for measuring the potential of a charged condenser, a condenser, a source of current having one terminal connected to one side of said condenser, a resistor connected across said source, said resistor being divided into a plurality of known voltage portions of said source, a measuring instrument, a double pole double throw switch connected to the measuring instrument, connections extending from the switch to the resistor and the condenser so that the difference between a known portion of the resistor and the voltage of the condenser may be impressed across the measuring instrument in one position of the switch and the voltage of another known portion of the resistor may be impressed across the measuring instrument in another position of the switch.

3. In voltage measuring apparatus for measuring the potential of a charged condenser, a source of current, a condenser associated with said source, means for dividing said source into a plurality of known voltage portions, a measuring instrument associated with said voltage dividing means and said condenser, a plurality of conductors extending from said source and said condenser to a point remote therefrom, a relay in one of said conductors adapted to be moved in a closed position to complete a circuit from said source to said condenser, said relay being operably responsive to the opening of said circuit to disconnect at least one of the conductors extending to the remote point from the measuring apparatus.

4. The method of measuring the voltage of a charged condenser which comprises, dividing the voltage source which was used in charging said condenser into a plurality of known fractions thereof, measuring a known fraction of the voltage together with the voltage of the condenser to determine the difference between the known fraction and the condenser voltage, and thereafter selecting a portion of the known fractions which will produce a voltage reading equal to the first measurement and deducing the time required to charge said condenser from the known voltage portions.

5. The method of measuring the voltage of a charged condenser which comprises, dividing the voltage source which was used in charging the condenser into a plurality of known fractions thereof, measuring a fraction of the known voltage together with the voltage of the condenser to determine the difference between the known fraction and the condenser voltage, and thereafter selecting another portion of the known fractions which will provide a voltage equal to the first measurement without including the condenser voltage, whereby the time required to charge said condenser from said source may be deduced from the known fractions of the supply circuit.

6. The method of measuring the voltage of a charged condenser which comprises, dividing the voltage source which was used in charging said condenser into a plurality of known fractions thereof, measuring the potential on the condenser, thereafter selecting a portion of the known fractions which will produce a voltage reading equal to the first measurement and deducing the time required to charge said condenser from the said portion of the known fractions.

7. In voltage measuring apparatus for measuring the potential of a charged condenser, a source of current having one terminal connected to one side of said condenser, a resistor connected across said source, said resistor being divided into a plurality of known voltage portions of said source, a measuring instrument, a double pole double throw switch connected to the measuring instrument, connections extending from the switch to the resistor and the condenser so that the voltage of the condenser may be impressed across the measuring instrument in one position of the switch and the voltage of a known portion of the resistor may be impressed across the measuring instrument in another position of the switch.

8. In voltage measuring apparatus for measuring the potential of a charged condenser, a charged condenser, a source of current of known voltage, a potentiometer associated with said condenser connected across said source, said potentiometer having contacts arranged therealong at spaced intervals to provide divided voltage portions of a total voltage of said source, measuring means, and means for connecting said measuring means to one side of said condenser and to a contact of said potentiometer so that the difference between a known portion of the total voltage of the source and the potential of the condenser may be used as a measuring voltage, a charged auxiliary condenser having residual charge characteristics similar to the first mentioned condenser, means for momentarily short-circuiting the auxiliary condenser, and means for connecting said auxiliary condenser in series with the first mentioned condenser so that the sum of the voltages of the two condensers will be constant.

9. In voltage measuring apparatus for measuring the potential of a charged condenser, a charged condenser, a source of current, a potentiometer associated with said condenser and connected across said source, said potentiometer being divided into known portions of the voltage of said source, a measuring circuit, a switch for connecting said measuring circuit to one side of the condenser and to a known portion of said voltage derived from said potentiometer so that the difference between the known portion of the total voltage of the source and the potential of the condenser may be impressed across the measuring circuit, said switch being movable to another position to connect the measuring circuit across a variable portion of the source so that the variable voltage can be compared with the first mentioned voltage, a charged auxiliary condenser having residual charge characteristics similar to the first mentioned condenser, means for momentarily short-circuiting the auxiliary condenser and means for connecting said auxiliary condenser in series with the first mentioned condenser so that the sum of the voltages of the two condensers will be constant.

10. In voltage measuring apparatus for measuring the potential of a charged condenser, a condenser, a source of current having one terminal connected to one side of said condenser, a resistor connected across said source, said resistor being divided into a plurality of known voltage portions of said source, a measuring instrument, a double pole double throw switch connected to the measuring instrument, connections extending from the switch to the resistor and the condenser so that the difference between a known portion of the resistor and the voltage of the condenser may be impressed across the measuring instrument in one position of the switch and the voltage of another known portion of the resistor may be impressed across the measuring instrument in another position of the switch, a charged auxiliary condenser having residual charge characteristics similar to the first mentioned condenser, means for momentarily short-circuiting the auxiliary condenser, and means for connecting said auxiliary condenser in series with the first mentioned condenser so that the sum of the voltages of the two condensers will be constant.

11. In voltage measuring apparatus for measuring the potential of a charged condenser, a source of current having one terminal connected to one side of said condenser, a resistor connected across said source, said resistor being divided into a plurality of known voltage portions of said source, a measuring instrument, a double pole double throw switch connected to the measuring instrument, connections extending from the switch to the resistor and the condenser so that the voltage of the condenser may be impressed across the measuring instrument in one position of the switch and the voltage of a known portion of the resistor may be impressed across the measuring instrument in another position of the switch, and a charged auxiliary condenser having residual charge characteristics similar to the first mentioned condenser, means for momentarily short-circuiting the auxiliary condenser, and means for connecting said auxiliary condenser in series with the first mentioned condenser so that the sum of the voltages of the two condensers will be constant.

12. In voltage measuring apparatus for measuring the potential of a charged condenser, a charged condenser, a source of current of known voltage, a potentiometer associated with said condenser connected across said source, said potentiometer having contacts arranged therealong at spaced intervals to provide divided voltage portions of the total voltage of said source, measuring means, means for connecting said measuring means to one side of said condenser and to a contact of said potentiometer so that the difference between a known portion of the total voltage of the source and the potential of the condenser may be used as a measuring voltage, a charged auxiliary condenser having residual charge characteristics similar to the first mentioned condenser, and means for connecting said auxiliary condenser in series with the first mentioned condenser so that the sum of the voltages of the two condensers will be constant.

MATHIAS OLUF JÖRGENSEN.
MARIUS PETER WEIBEL.